Figure 1:
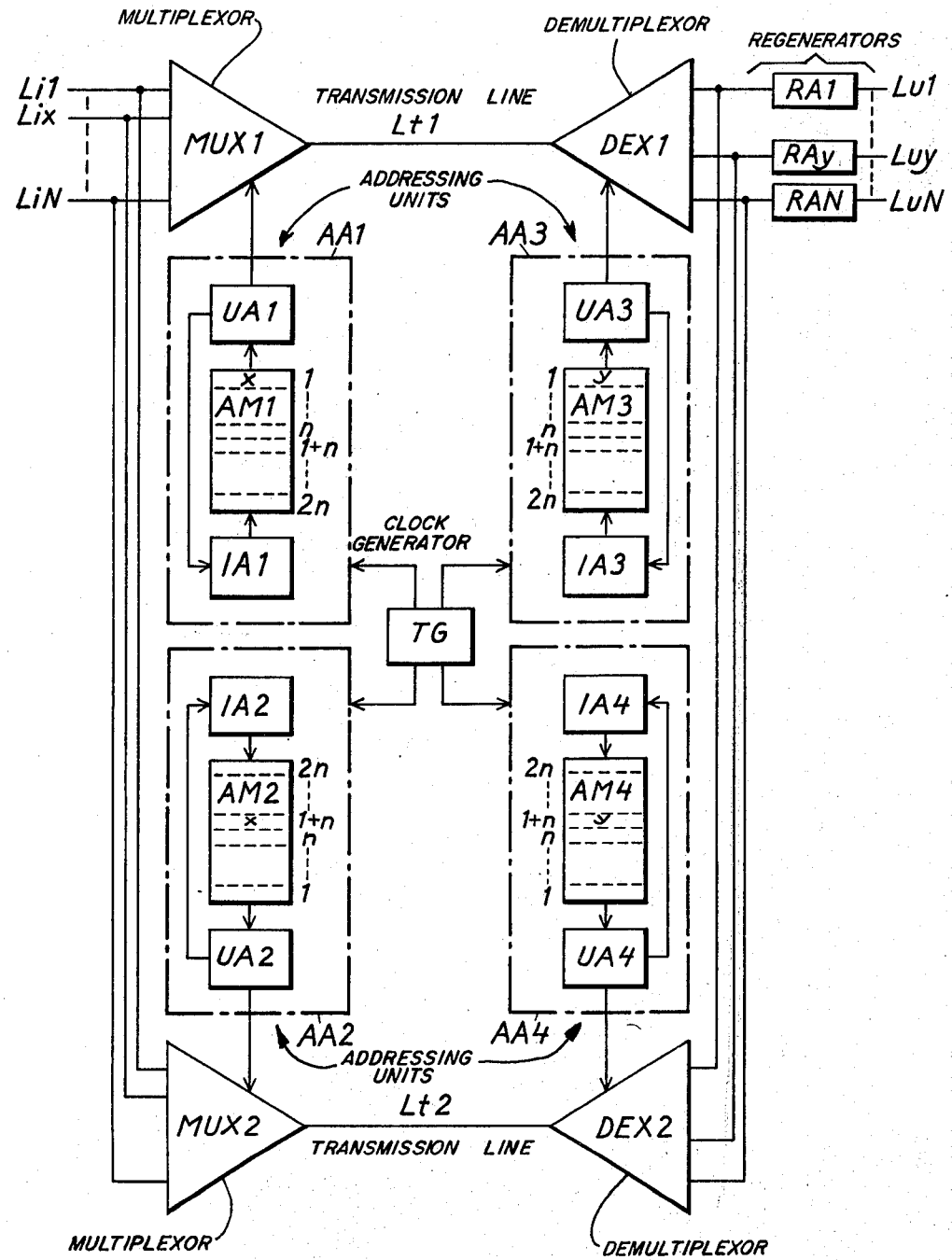

a
United States Patent [19]
Jeppsson et al.

[11] 3,940,566
[45] Feb. 24, 1976

[54] ARRANGEMENT FOR PREVENTING INTERRUPTIONS IN A TIME DIVISION MULTIPLEX TRANSMISSION LINK FOR TRANSFER OF DATA

[75] Inventors: Martin Wilhelm Ivan Jeppsson, Bromma; Bruce William Lindstrom, Ekero, both of Sweden; David John Russell, Heidelberg, Australia

[73] Assignee: Telefonaktiebolaget L M Ericsson, Stockholm, Sweden

[22] Filed: Sept. 12, 1974

[21] Appl. No.: 505,255

[30] Foreign Application Priority Data
Sept. 27, 1973 Sweden .............................. 7313161

[52] U.S. Cl. ................... 179/15 BF; 340/146.1 BE
[51] Int. Cl.² ............................................ H04J 3/06
[58] Field of Search ......... 179/15 BF, 15 A, 15 AT, 179/18 FG, 15 AS; 178/50; 307/23; 340/146.1 BE

[56] References Cited
UNITED STATES PATENTS

| | | | |
|---|---|---|---|
| 3,406,257 | 10/1968 | Long .............................. | 179/15 AS |
| 3,603,736 | 9/1971 | Morroll ........................... | 179/15 BF |
| 3,723,657 | 3/1973 | Muller ............................ | 179/15 A |
| 3,818,237 | 6/1974 | Straus ............................. | 307/23 |

Primary Examiner—William C. Cooper
Assistant Examiner—E. S. Kemeny
Attorney, Agent, or Firm—Hane, Baxley & Spiecens

[57] ABSTRACT

The present invention relates to an arrangement in a time division multiplex link having at least two pairs of multiplexors and demultiplexors interconnected by separate transmission lines, i.e., redundant transmission systems, with delay, in which time division multiplex channels are formed through the cyclic scanning of the multiplexor inlets and demultiplexor outlets, respectively so that data signals presented to the multiplexor inlets are transferred via the time division multiplex channels in the form of sampling signals to regeneration arrangements connected to the demultiplexor outlets. The sampling signals passed over the separated (redundant) time division multiplex channels are interlaced, i.e., different delays on different transmission lines, thereby producing a resultant sampling density which, when a fault occurs, is reduced by a factor corresponding to the share of the faulty channel in the total number of channels.

5 Claims, 2 Drawing Figures

ARRANGEMENT FOR PREVENTING INTERRUPTIONS IN A TIME DIVISION MULTIPLEX TRANSMISSION LINK FOR TRANSFER OF DATA

The present invention relates to an arrangement for use in a time division multiplex transmission link handling binary data in the form of sampling signals. In such links the binary data received on a number of inlets are multiplexed through time division onto a common transmission line and subsequently separated to be fed out on a corresponding number of outlets. The multiplexing takes place in a so-called multiplexor and the separation or demultiplexing in a so-called demultiplexor, both of which are generally built up of gate networks controlled by means of addressing devices. Furthermore, the gate networks generally have a hierarchic configuration, meaning that the multiplexing and demultiplexing, respectively, are made gradually and in several steps. Therefore the reliability of all the channels of the link, formed by the time division, rests heavily on a few components close to the transmission line. See the report TRITA-TTS-7203 of the Royal Institute of Technology: "Digital telephone exchanges. A comparative study of time division multiplexed switching networks."

It is necessary to eliminate the effect of component failures on the function of the link as far as possible. In order to reduce the effect of a fault to only a limited number of channels one can divide the channels among a number of physically separated units which can be reached by all inlets and outlets. If a fault occurs in such a unit, the traffic in progress on the corresponding channels will be interrupted. This disadvantage can be avoided if the number of channels is increased so that each data connection can be established via at least two channels, chosen from different units, working completely in parallel. With this method interruptions are prevented, but at the cost of a considerable quantity of redundant components.

An object of the invention is to prevent interruptions while maintaining a high component efficiency in time division multiplex transmission of signals. In accordance with the invention, the object is satisfied by establishing each data connection via parallel channels, including in physically separated units, which transfer the sampling signals alternatingly. The effective sampling density is thus proportional to the number of active channels and therefore a fault in a channel results in a corresponding reduction of the sampling density for the data connections in question as long as the fault exists.

The characteristics of the invention appear from the claims.

Figure 2:
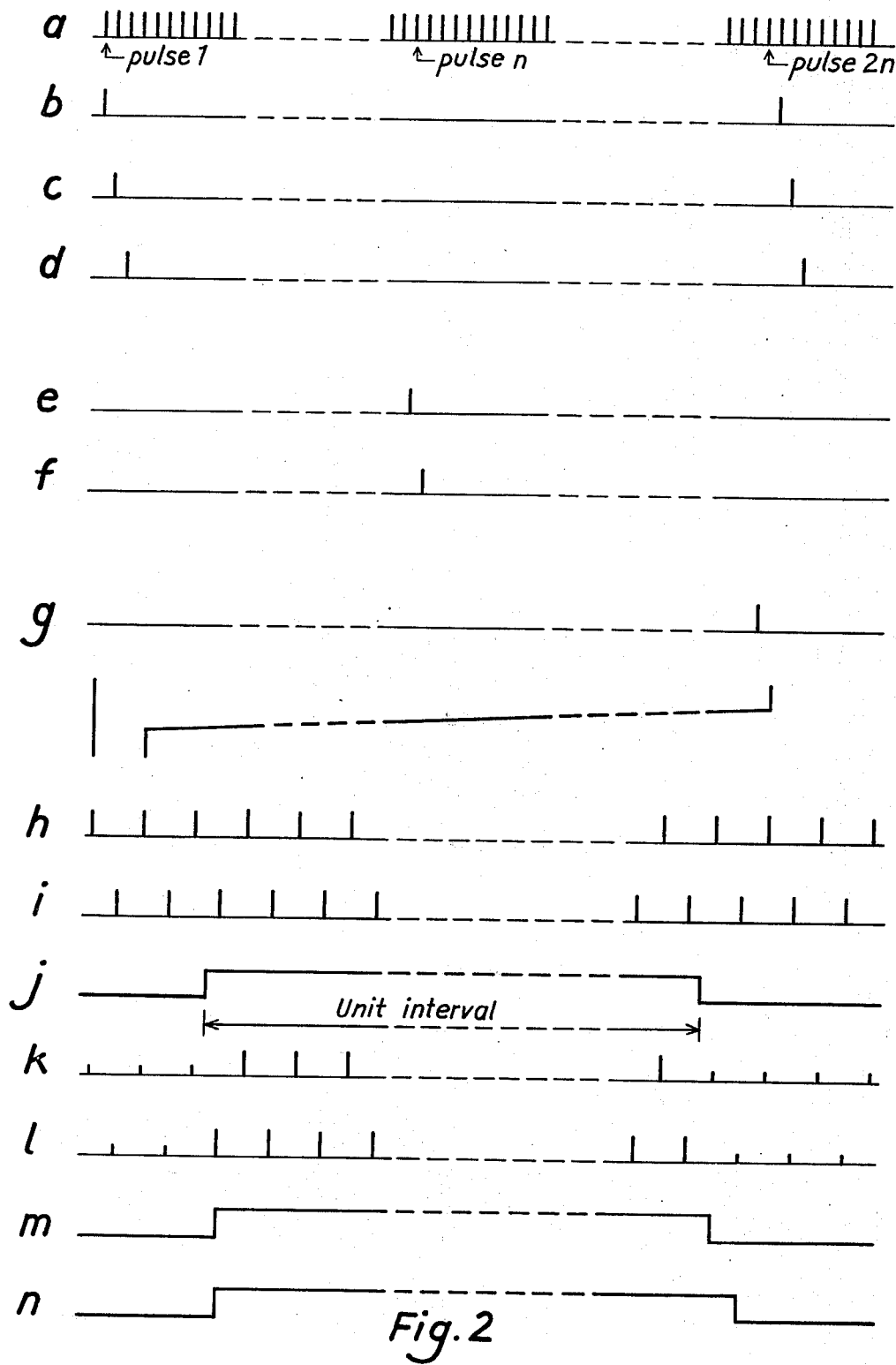

The invention will be explained below by means of an embodiment with reference to the accompanying drawing, in which FIG. 1 is a block diagram of an arrangement according to the invention and FIG. 2 is a timing diagram which illustrates the operation of the arrangement.

FIG. 1 shows a time division multiplex transmission link for transfer of binary data from, according to the example, N inlets Li 1 - Li N to the same number of outlets Lu 1 - Lu N via two multiplexor arrangements MUX1, MUX2 and two demultiplexor arrangements DEX1, DEX2, which are interconnected by two transmission lines Lt 1, Lt 2, and a number N of regenerators RA 1 - RA N. To each multiplexor and demultiplexor arrangement belongs one of the addressing units AA1 to AA4. A typical addressing unit AAN comprises an address memory AMN, a write-in arrangement IAN and a read-out arrangement UAN, where N=1 to 4. The addressing units receive clock signals from a clock generator TG which controls the scanning of the address memories. Each address memory, for example memory AM1, contains 2n memory cells in which a corresponding number of addresses can be written in by means of the write-in arrangement IA1 and be read out by means of the read-out arrangement UA1, respectively, in step with the scanning. At every read-out occasion the read-out arrangement transfers the address in question to the respective multiplexor and demultiplexor units, the corresponding inlet and outlet being through-connected via the transmission line. As concerns the outlet, however, the connection is via the regeneration unit in question. The memory cells are scanned cyclically, the cycle frequency being equal to the quotient of the clock signal frequency divided by the number of memory cells per address memory, i.e. 2n. This is illustrated in FIG. 2, in which is shown on line (a) a pulse train constituting the clock signals from the timing device TG while on the lines (b) - (g) pulses are shown, which represent the read-out occasions for the memory cells 1, 2, 3, n, 1+n and 2n. When establishing a connection between an inlet Li $x$ and an outlet Lu $y$ the address $x$ is written into a free memory cell in each of the address memories AM1 and AM2, the memory cells being chosen so that the time displacement at read-out will be half a cycle time, i.e., n addresses. Simultaneously the address $y$ is written into the corresponding memory cells in the address memories AM3 and AM4. If, for example, as indicated in FIG. 1 the memory cells 1 and 1+n are chosen, the addresses $x$ and $y$ will be read out from the address memories AM1 and AM3 on the occasions represented by the pulses on line (b) in FIG. 2 and from the address memories AM2 and AM4 according to line $f$. The pulses according to the lines (b) and (f) are reproduced in a compressed scale on lines (h) and (i) which clearly illustrates that they appear alternatingly with each other and at regular intervals. Line (j) reproduces a unit interval of a binary data signal coming in on inlet Li $x$ which is to be transferred to outlet Lu $y$. The through-connection being executed on every read-out occasion according to the lines (h) and (i) implies that the data signal is being sampled by the multiplexor arrangements MUX1, MUX2 on every such occasion and that sampling signals according to lines (k) and (l) are being transferred by the transmission lines Lt 1, Lt 2 and then forwarded by the demultiplexor arrangements DEX1, DEX2 to the regeneration arrangement RA $y$. As appears from FIG. 2 the sampling signals follow the level changes of the binary data signal. The sampling signals are fed to a bistable flip-flop circuit included in a way known per se in the regeneration arrangement. The flip-flop circuit adopts the one or the other of its two conditions in correspondence to the level changes of the sampling signals. By means of the flip-flop circuit thus a regenerated data signal is obtained on the outlet Lu $y$ in accordance with line (m) which reproduces the signal on line (j) with an accuracy being determined by the density of the sampling pulses.

If malfunction occurs in, for example, the multiplexor arrangement MUX1 so that the sampling pulses according to line (k) do not appear, no interruption in the transmission arises because of this fault, as the sampling signals according to line (1) still can be transferred. The regenerated data signal is then according to line (n), from which it is that the reproduction accuracy has been halved. For a system which normally works with a reproduction accuracy of for example 1% of the unit interval a halving thus would mean a reduction of the accuracy to 2%, a reduction which only has marginal effects. For systems normally working with considerably less reproduction accuracy a halving of the accuracy may not be tolerated. It is in such cases suitable, for every established connection to use a greater number of parallel channels included in a correspondingly greater number of physically separated units. The probability that a fault, occurring on such a channel, should influence the reproduction accuracy is then correspondingly less.

We claim:

1. In a time division multiplex transmission link for the transfer of binary data from a number of inlets to a corresponding number of outlets, the combination comprising a first multiplexor, a first transmission line and a first multiplexor connecting the inlets to the outlets, a second multiplexor, a second transmission line and a second demultiplexor also connecting the inlets to the outlets, each of said multiplexors generating sampling values resulting from the cyclical scanning of the inlets in response to the receipt of first addressing signals wherein each addressing signal is associated with one of the inlets, each sampling value representing the instantaneous value of the data when an inlet is scanned, means for transferring the sampling values from said multiplexors via the associated transmission line to the associated demultiplexor, means in the demultiplexors for transferring the received sampling values to the outlets in response to the receipt of second addressing signals, wherein each second addressing signal is associated with one of the outlets, a first addressing means for sequentially generating a first set of said first addressing signals for transfer to said first multiplexor, a second addressing means for sequentially generating a second set of said first addressing signals for transfer to said second multiplexor, said first and second sets being interleaved in time, a third addressing means for sequentially generating a first set of said second addressing signals for transfer to said first demultiplexor, a fourth addressing means for sequentially generating a second set of said second addressing signals for transfer to said second demultiplexor, said first and second sets of said second addressing signals being interleaved in time, and synchronizing means for intersynchronizing said addressing means.

2. The combination of claim 1 wherein each of said addressing means comprises an address memory with a number of memory cells, a write-in arrangement including means for writing into said memory cells scanning addresses in correspondence to the inlets or outlets, and a read-out arrrangement including means for cyclically scanning said memory cells at a rate at which said sampling values are to be transferred to said transmission lines and means for converting the addresses to the addressing signals.

3. The combination of claim 2 wherein the memory cells of address memories are sequentially scanned in sychronism in response to said synchronizing means.

4. The combination of claim 3 wherein the memory cells in said first addressing means storing the address associated with any inlet is scanned a fixed period of time before the scanning of the memory cell in said second addressing means storing the address associated with the same inlet.

5. The combination of claim 1 further comprising signal regenerating means connecting said demultiplexors to the outlets.

* * * * *